Nov. 17, 1931.  A. ALSAKER ET AL  1,831,836
SHAFT COUPLING
Filed April 29, 1927
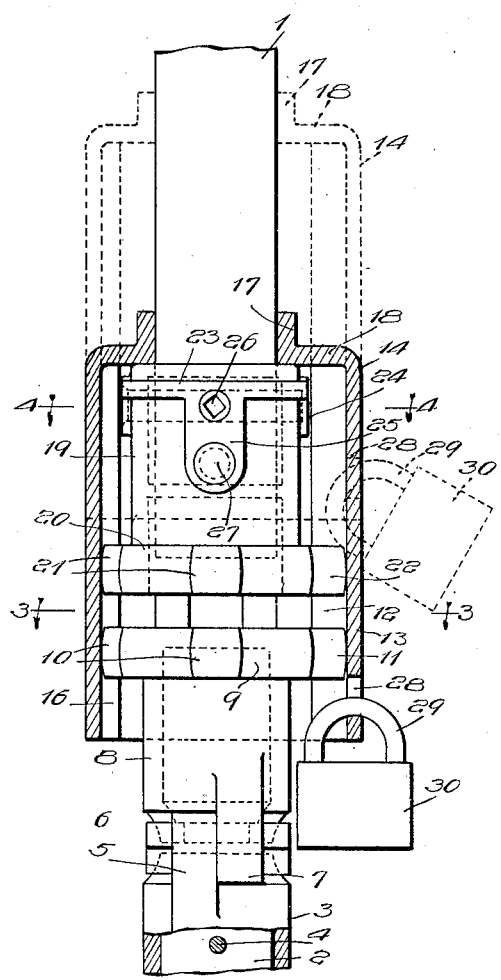
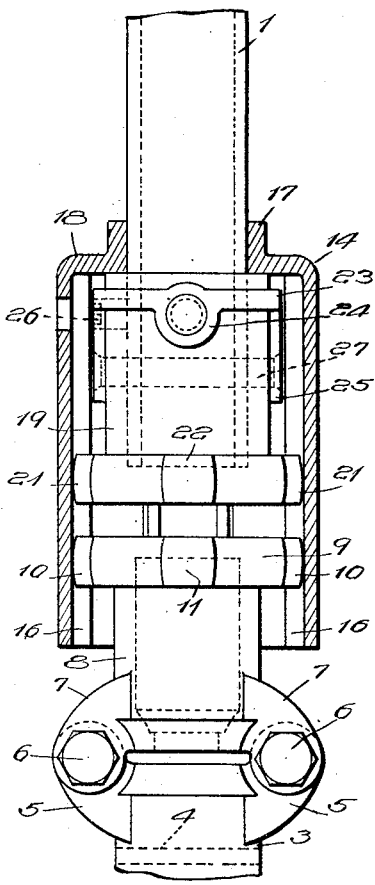
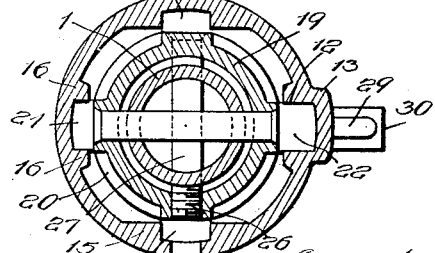

Patented Nov. 17, 1931

1,831,836

UNITED STATES PATENT OFFICE

ALFRED ALSAKER AND MANFRED STENE, OF CHICAGO, ILLINOIS, ASSIGNORS TO THE DELTA-STAR ELECTRIC COMPANY, OF CHICAGO, ILLINOIS, A CORPORATION OF ILLINOIS

SHAFT COUPLING

Application filed April 29, 1927. Serial No. 187,669.

This invention relates to coupling devices, and more particularly to means for coupling together a driven shaft and an operating shaft for operating an electric switch or other mechanism.

Our invention relates more particularly to a coupling having means by which the switch operating shaft can be connected to or disconnected from a motor driven shaft, optionally, such means including a connecting element which can be locked in either operative or inoperative position so as to prevent operation of the switch operating shaft from the motor driven shaft, when desired. In a broader aspect, our invention has to do with means whereby two shafts may be connected together for rotation, such means being capable of adjustment whereby operating connection of the shafts is prevented, permitting the shafts to be rotated independently of each other. An additional feature of our invention is the provision of a coupling device of the character stated which provides, to a limited extent, a universal connection between the shafts whereby proper operating connection between the shafts can be accomplished, even though the shafts are disposed out of co-axial relation or eccentric to each other. One of the main objects of our invention is to provide a coupling device of the character stated of simple and inexpensive construction and operation which may be locked in either operative or inoperative condition. A further object is to provide a device of this character which can be used in connection with shafts disposed eccentric or in angular relation to each other. Further objects and advantages will appear from the detailed description.
In the drawings:—

Fig. 1 is a side view of a coupling device constructed in accordance with our invention and locked in operative condition, the connecting sleeve being shown in central vertical section;

Fig. 2 is a view similar to Fig. 1, but taken in a plane at right angles thereto;

Fig. 3 is a section taken substantially on line 3—3 of Fig. 1; and

Fig. 4 is a section taken substantially on line 4—4 of Fig. 1.

Our shaft coupling is illustrated as used in connection with an upper shaft 1 and a lower shaft 2, the former of which may be connected to an electric switch or any other mechanism to be operated thereby, shaft 2 being either power driven by means of a suitable motor and associated mechanism, or, if desired, this shaft may be hand operated. Our coupling is particularly adapted, however, for use in connection with a switch operated by shaft 1, shaft 2 being power driven as from a suitable motor.

A socket member 3 is secured on the upper end of shaft 2 by means of a rivet 4, or in any other suitable or preferred manner. This socket member is provided with two outwardly projecting ears 5 which are eccentrically disposed and which are secured by bolts 6, or in any other suitable or preferred manner, to similar ears 7 which project from the lower end portion of a lower coupling member 8. The ears 5 are curved or arched upwardly, the ears 7 being arched downwardly so that the adjacent ends of the two members 3 and 8 are spaced a short distance apart. Coupling member 8 is of cylindrical shape and is provided at its upper end with an outer annular flange 9 having a plurality of projections or teeth 10 projecting therefrom radially of the coupling member. This flange is further provided with a tooth 11 which is of greater depth than the teeth 10, this latter tooth extending into a groove 12 formed in a thickened portion or boss 13 of a connecting sleeve 14, when the sleeve is in operative position. The other teeth 10 also extend into recesses or grooves provided in the inner face of sleeve 14, two of these grooves being formed in thickened elements 15 of the sleeve, the other groove being formed by parallel ribs 16 projecting from the inner face of the sleeve and disposed in spaced relation, these ribs being diametrically opposite to the thickened portion 13 of the sleeve. All of these grooves extend from the open end of sleeve 14, this being the lower end of the sleeve in the position thereof illustrated in Figs. 1 and 2. At its upper end, the sleeve is provided with a collar or neck 17, the lower end of which is connected by shoulder 18 to the upper end of the body of the sleeve. This collar 17 fits about shaft 1 and provides means for slidably mounting the sleeve upon the shaft for movement toward and away from the coupling member 8 and the upper coupling member 19 secured upon the lower end of shaft 1. This upper coupling member is also of cylindrical shape and is provided at its lower end with an annular flange 20 from which project teeth 21 and 22 corresponding to teeth 10 and 11, respectively, of the lower coupling member, tooth 22 being of appreciably greater depth than teeth 21 and extending into the groove 12 when the sleeve 14 is in lowered or operative position. The teeth of the two coupling members engage into the recesses or grooves of the connecting sleeve 14 when the latter is in lowered position, as illustrated, thus establishing through the body of the sleeve driving connection between the two shafts for operating the switch by power.

Coupling member 19 is provided, adjacent its upper end, with an annular reenforcing flange 23 from which depend two relatively short approximately circular lugs 24 and a pair of relatively long approximately rectangular lugs 25, the lugs of the respective pairs being disposed diametrically opposite. One of the lugs 25 is bored and threaded to receive a set screw 26 by means of which the coupling member 19 can be secured on the shaft 1 in proper relation to the coupling member 8 secured to shaft 2.

In assembling the sleeve is first slid over the upper portion of shaft 2. This is permitted by the distance apart of the two shafts and the relatively large interior diameter of the sleeve. The sleeve is then raised so that the collar 17 fits about shaft 1, and is then slid along this shaft to a sufficient distance to leave the space between the ends of the shafts unobstructed. This space is of greater length than the upper coupling member, as clearly illustrated. The upper coupling member is then inserted into the space between the ends of the shafts and is slid onto shaft 1. After this has been done the sleeve and the upper coupling member are held in position, either by hand or in any other suitable manner, to leave the space between the lower end of the upper coupling member and the upper end of shaft 2 unobstructed. Socket member 3 is then secured on shaft 2 and the lower coupling member is secured to the socket member 3. A spacer of proper thickness is then placed between the coupling members and serves to temporarily hold the upper coupling member in position. The sleeve is then slid down about the two coupling members this sleeve, together with the upper coupling member, being turned on shaft 1 until the teeth of the lower coupling member are properly aligned with the grooves of the sleeve, after which the sleeve is slid into its lowermost or full operative position. This serves to hold the coupling members in proper relation to each other and to the sleeve. The set screw 26 is then turned into binding engagement with shaft 1 by means of a suitable instrument inserted through an opening provided for this purpose adjacent the upper end of the sleeve as clearly shown in Fig. 2. The set screw serves to temporarily secure the upper coupling member to its shaft, permitting the sleeve to be raised sufficiently to completely expose the coupling member without disturbing its relation to the lower coupling member. The relatively wide collar 17 forms a bearing of appreciable area on shaft 1 which holds the sleeve against undesirable looseness or play and facilitates proper aligning of the coupling members by the sleeve, as well as facilitating movement of the sleeve into operative and inoperative positions.

After coupling member 19 has been properly positioned on shaft 1, it is permanently secured thereto by means of rivets 27 which are secured through the shaft 1, which may be formed from a suitable length of pipe, these rivets also passing through the coupling member 19 and the lugs 24 and 25. This provides simple and efficient means whereby the coupling member 19 can be preliminarily secured on shaft 1 and then permanently secured on the shaft after it has been accurately adjusted thereon and permits of the use of a relatively short sleeve.

As will be noted more clearly from Figs. 1 and 2, the coupling members 8 and 19 are disposed with their opposed faces spaced an appreciable distance apart and well out of contact with each other. This is to prevent undesirable friction as well as to eliminate the possibility of operation of one of the shafts when the other shaft is operated and the connecting sleeve 14 is in inoperative position. The sleeve 14 is provided, adjacent the open end thereof, with an opening 28 extending from the groove 12, this opening being adapted for reception of shackle 29 of a padlock 30 of suitable type. The inner portion of shackle 29 is disposed within groove 12 and is held by the lateral walls thereof in alignment with the tooth 11, as considered in Fig. 1 and Fig. 3, so that this shackle very effectually prevents withdrawal of the sleeve 14 into inoperative position. This provides simple and efficient means whereby the coupling can be locked in operative condition so as to prevent uncoupling of the two shafts by unauthorized persons. By removing the shackle 29 or lock 30 from opening 28, the sleeve 14 can be raised into inoperative position so as to destroy the driving connection between the two shafts, after which either shaft may be rotated independently of the other shaft. To eliminate the possibility of the sleeve 14 dropping into lowered or operative position, the shackle 29 of lock 30 is inserted through opening 28 above tooth 22 of the upper coupling member 19. With the shackle in this position, downward movement of the sleeve into operative position is positively prevented. This feature is of importance as effectually eliminating the possibility of shaft 1 being operated from the driven shaft 2 in the event that the circuit to the motor operating this latter shaft were accidentally closed. This is true, whether the shaft 2 be driven by a motor or be released from the motor and operated by hand as, for instance, where the motor is not operating or is being overhauled or repaired. It will thus be seen that, by our coupling device, we have provided simple and very highly efficient means whereby the two shafts may be connected together for operation, and disconnection of the shafts by unauthorized persons is prevented, this means also serving, when required, to positively prevent operation of either shaft by the other one. This latter feature is of particular value as protecting men working on or repairing the switch against the possibility of the switch being accidentally closed, due to operation of shaft 2. This feature of disconnecting the two shafts, when desired, is also of practical value as permitting operation of the motor, as when testing the motor circuit, without affecting the position of the switch. While we have described our invention as used in connection with a switch operating shaft and a motor driven shaft, it may be used for many other purposes where it is desirable to provide a coupling device whereby the shaft can be readily coupled or uncoupled, and unauthorized coupling or uncoupling of the shaft will be positively prevented.

By reference to Figs. 1 and 2, it will be noted that the outer end surfaces of all of the teeth of the two coupling members are of curved or arcuate shape, these teeth decreasing in width from their horizontal central portions toward each end thereof. The radius of curvature of the outer ends of the teeth is relatively small, so that a very appreciable rocking movement between the lower coupling member 8 and the sleeve 14 is possible without in any way destroying the driving connection between these members. This renders it possible to employ the coupling device illustrated in connection with shafts which are not co-axial, and such shafts may be disposed eccentric to each other or at an appreciable angle. In this manner the coupling device provides, to a limited extent, a universal connection between the two shafts which accommodates any inaccuracies in alignment of the shafts and, where circumstances require, permits the shafts to be disposed in angular relation, within limits. It will also be noted from Figs. 1 and 2 that the lateral faces of the teeth of the coupling members are rounded or arcuate, such spaces tapering oppositely from the vertical central points thereof. This rounding of the lateral faces of the teeth facilitates entry of the teeth of the coupling members into the recesses or grooves of the connecting sleeve 14.

What we claim is:—

1. In operating means of the character described, an operating shaft, a driven shaft disposed with one end adjacent one end of the operating shaft, coupling members secured to the adjacent ends of the shafts, a connecting member mounted on one of the shafts and movable into and out of position to establish driving connection between said coupling members, and means engageable with said connecting member and one of the coupling members for holding the connecting member in operative position and engageable with said connecting member and the other coupling member for holding the connecting member in inoperative position.

2. In operating means of the character described, an operating shaft, a driven shaft, coupling members secured to said shafts, a connecting member mounted on one of the shafts and movable into and out of position to establish driving connection between the coupling members, and key operated locking means engageable with one of the coupling members for holding the connecting member in operative position and with the other coupling member for holding the connecting member in inoperative position, optionally.

3. In operating means of the character described, an operating shaft, a driven shaft, said shafts being disposed in substantial alignment, coupling members secured to the adjacent ends of the shafts and having radially projecting teeth, and a sleeve slidable on one of the shafts toward and away from the coupling members and of a length to enclose and extend beyond the teeth of said members, the sleeve being provided in its inner face with grooves extending from its open end and disposed to receive the teeth of the coupling members, one of said grooves being of greater depth than the other grooves and the coupling members each having a tooth of increased depth for engagement into said groove, the sleeve being provided adjacent its open end with an opening extending from the relatively deep groove for reception of a lock shackle.

4. In operating means of the character described, two substantially co-axial shafts, a sleeve moveable along one of the shafts, and having a flange engageable therewith, a coupling member adapted to be secured on said shaft, the distance between the adjacent ends of the shafts being at least equal to the length of the coupling member and the sleeve being adapted to be placed on its shaft by being inserted between the ends of the shafts and then moved axially over its associated shaft, said coupling member being adapted to be secured to said one shaft after the sleeve has been placed thereon, a socket member secured on the other shaft, a second coupling member, and means for securing said second coupling member to the socket member, the coupling members being disposed closely adjacent each other and the sleeve being of a length to enclose both coupling members when in operative position, said sleeve and the coupling members having cooperating means for locking said coupling members against unauthorized coupling or uncoupling of the members.

5. In operating means of the character described, two substantially co-axial shafts, a sleeve movable along one of the shafts, a coupling member secured on said shaft, the distance between the adjacent ends of the shafts being at least equal to the length of the coupling member and the sleeve being adapted to be placed on its shaft by being inserted between the ends of the shafts and then moved axially over its associated shaft, a socket member secured on the other shaft, a second coupling member, means for securing said second coupling member to the socket member, the coupling members being disposed closely adjacent each other and the sleeve being of a length to enclose both coupling members when in operative position, said sleeve and the coupling members having cooperating means for locking said coupling members together, and means for temporarily securing the first coupling member on its shaft when the sleeve is in operative position holding the coupling members in predetermined relation to each other and the sleeve in assembling.

6. In operating means of the character described, two substantially co-axial shafts, a sleeve moveable along one of the shafts, a coupling member secured on said shaft, the distance between the adjacent ends of the shafts being at least equal to the length of the coupling member but less than the length of the sleeve, the latter having a diameter sufficient to permit it to be placed on its shaft by being inserted between the ends of the shafts and then moved axially over its associated shaft, a socket member secured on the other shaft, a second coupling member, and means for securing said second coupling member to the socket member, the coupling members being disposed closely adjacent each other and the sleeve being of a length to enclose both coupling members when in operative position, said sleeve and the coupling members having cooperating means for locking said coupling members against unauthorized coupling or uncoupling of the members.

7. In combination, two axially aligned shafts having spaced apart adjacent ends, a sleeve slidable along one of the shafts and one end provided with a flanged shoulder fitting said one shaft, the distance between said shaft ends permitting the insertion of said sleeve, a coupling member adapted to be secured to said one shaft and to limit the movement of said sleeve along the shaft, a second coupling member attachable to the other shaft, the coupling members being disposed closely adjacent each other and the sleeve being of a length to enclose both coupling members when in operative position.

8. In operating means of the character described, an operating shaft, a driven shaft, said shafts being disposed in substantial alignment, coupling members secured to the adjacent ends of the shafts and having radially projecting teeth, and a sleeve slidable on one of the shafts toward and away from the coupling members and of a length to enclose the teeth of said members, the sleeve being open at one end and closed at the other end, and provided in its inner face with grooves extending from its open end to the other end and disposed to receive said teeth.

In witness whereof, we hereunto subscribe our names this 27th day of April, 1927.

ALFRED ALSAKER.
MANFRED STENE.